May 15, 1962 W. KASTEN 3,034,656
FUEL QUALITY TESTING DEVICE
Filed Aug. 10, 1959 5 Sheets-Sheet 1
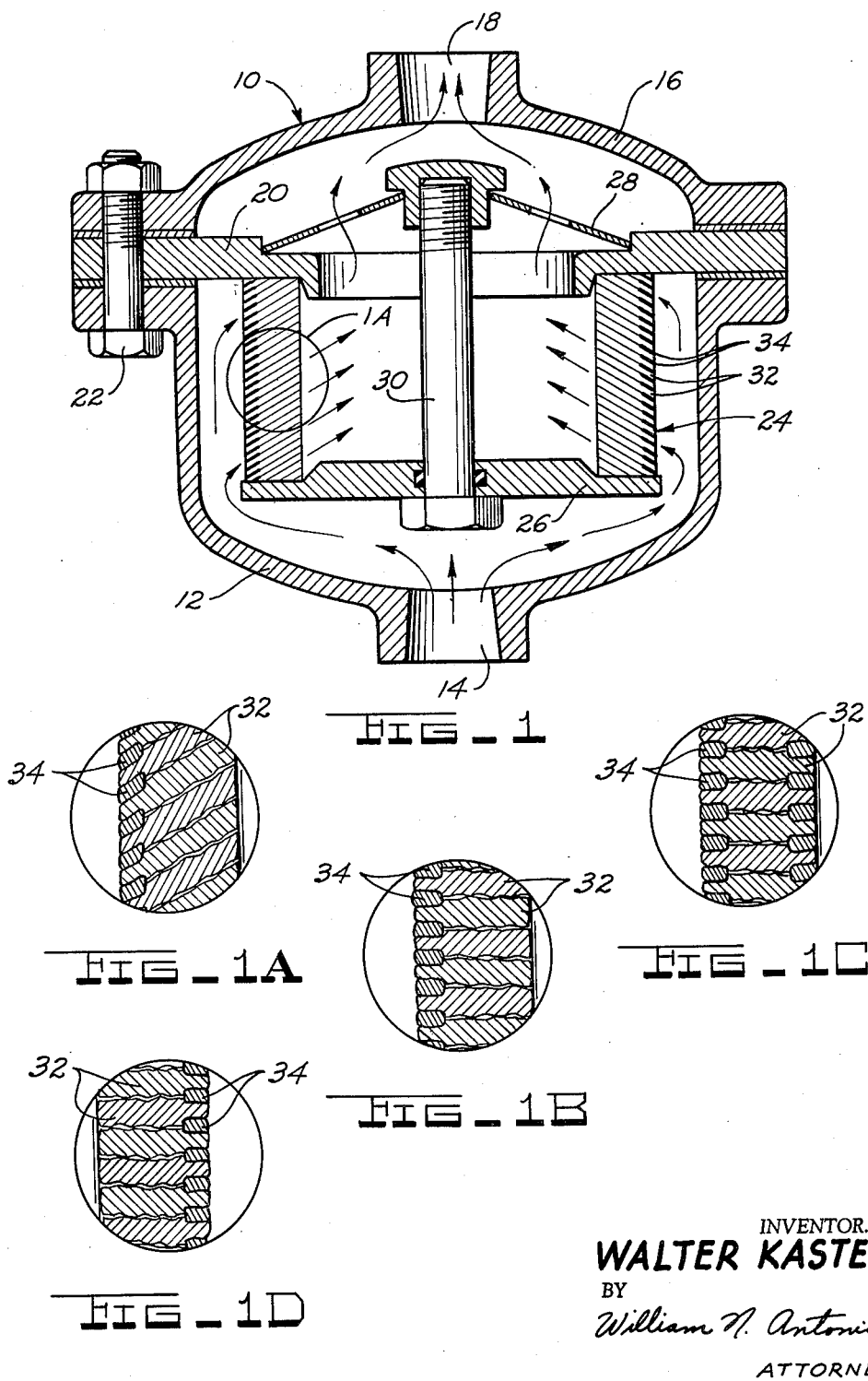
INVENTOR.
WALTER KASTEN
BY
William N. Antonis
ATTORNEY.

May 15, 1962 W. KASTEN 3,034,656
FUEL QUALITY TESTING DEVICE
Filed Aug. 10, 1959 5 Sheets-Sheet 2
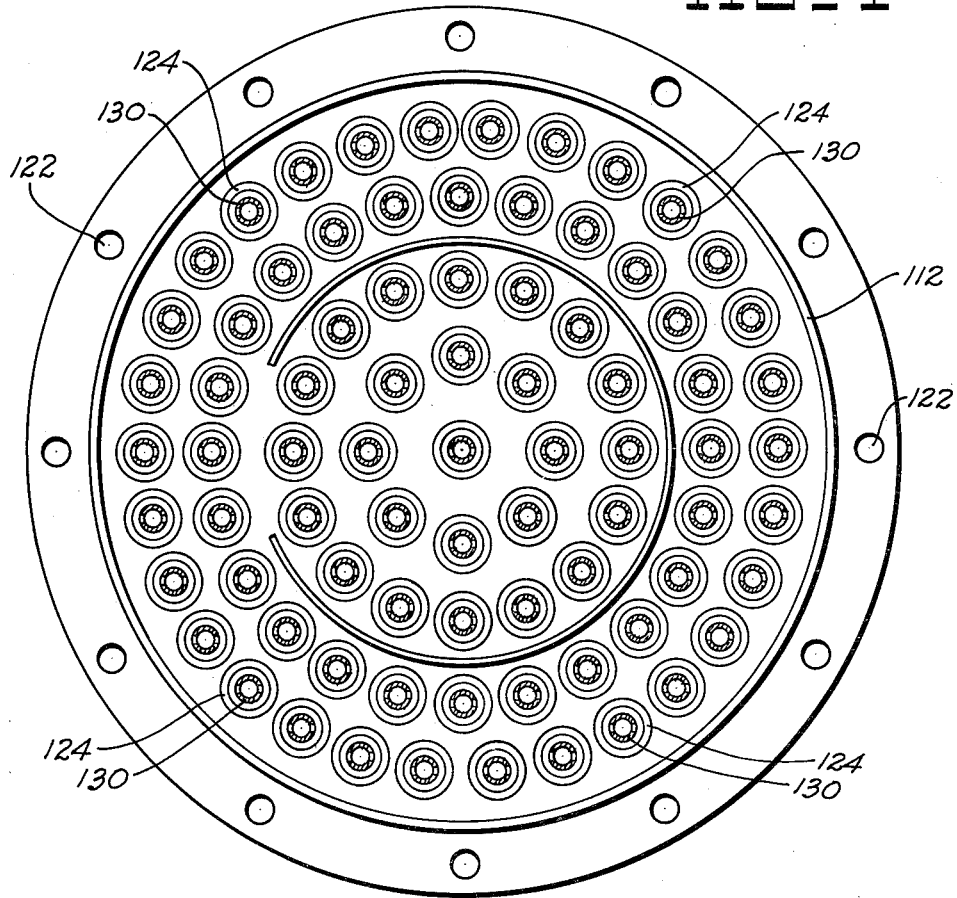
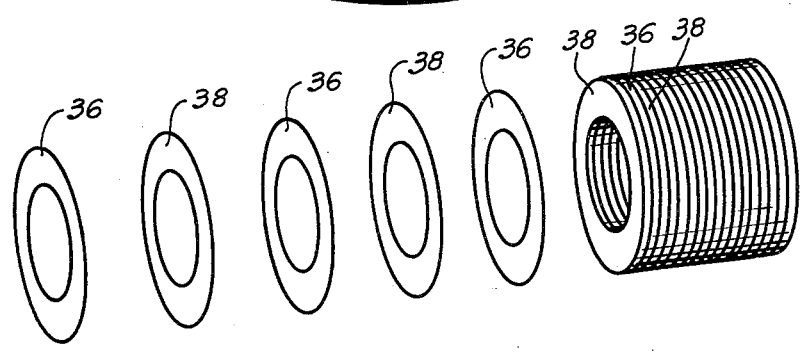
INVENTOR.
WALTER KASTEN.
BY
*William N. Antonio*
ATTORNEY.

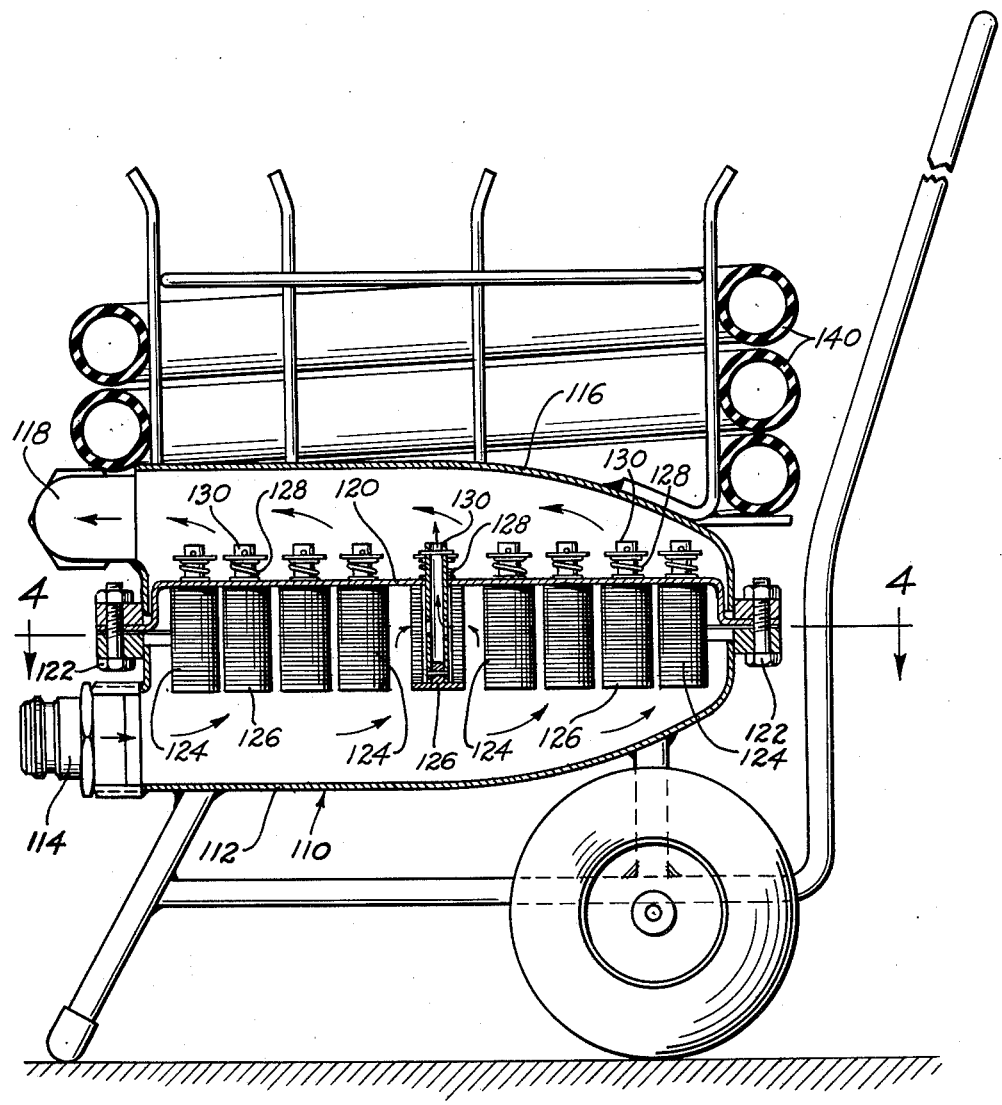
FIG_3

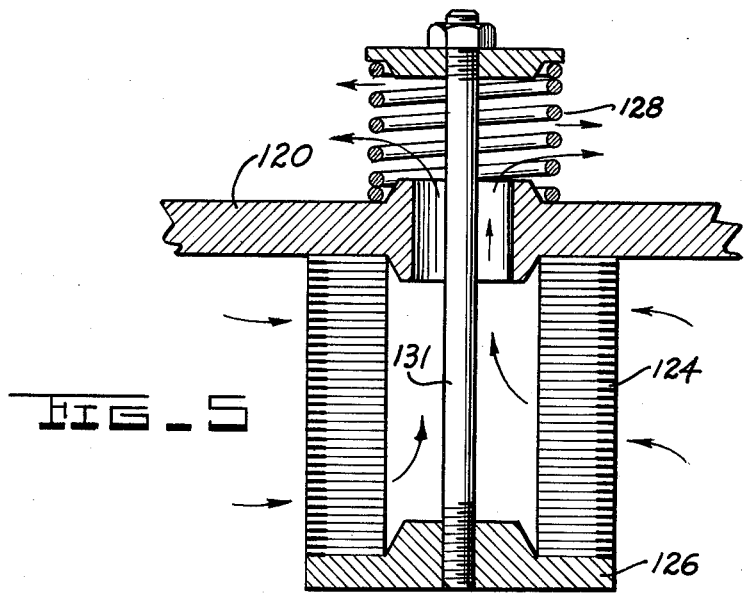
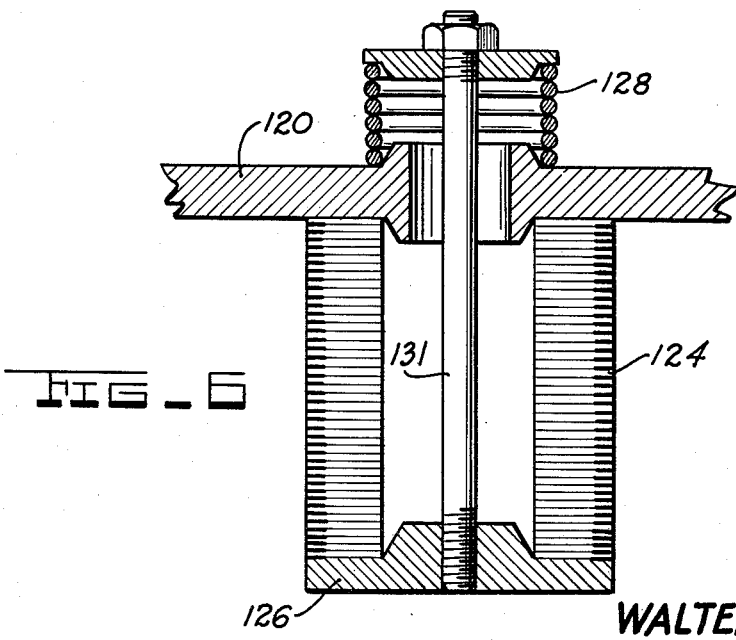

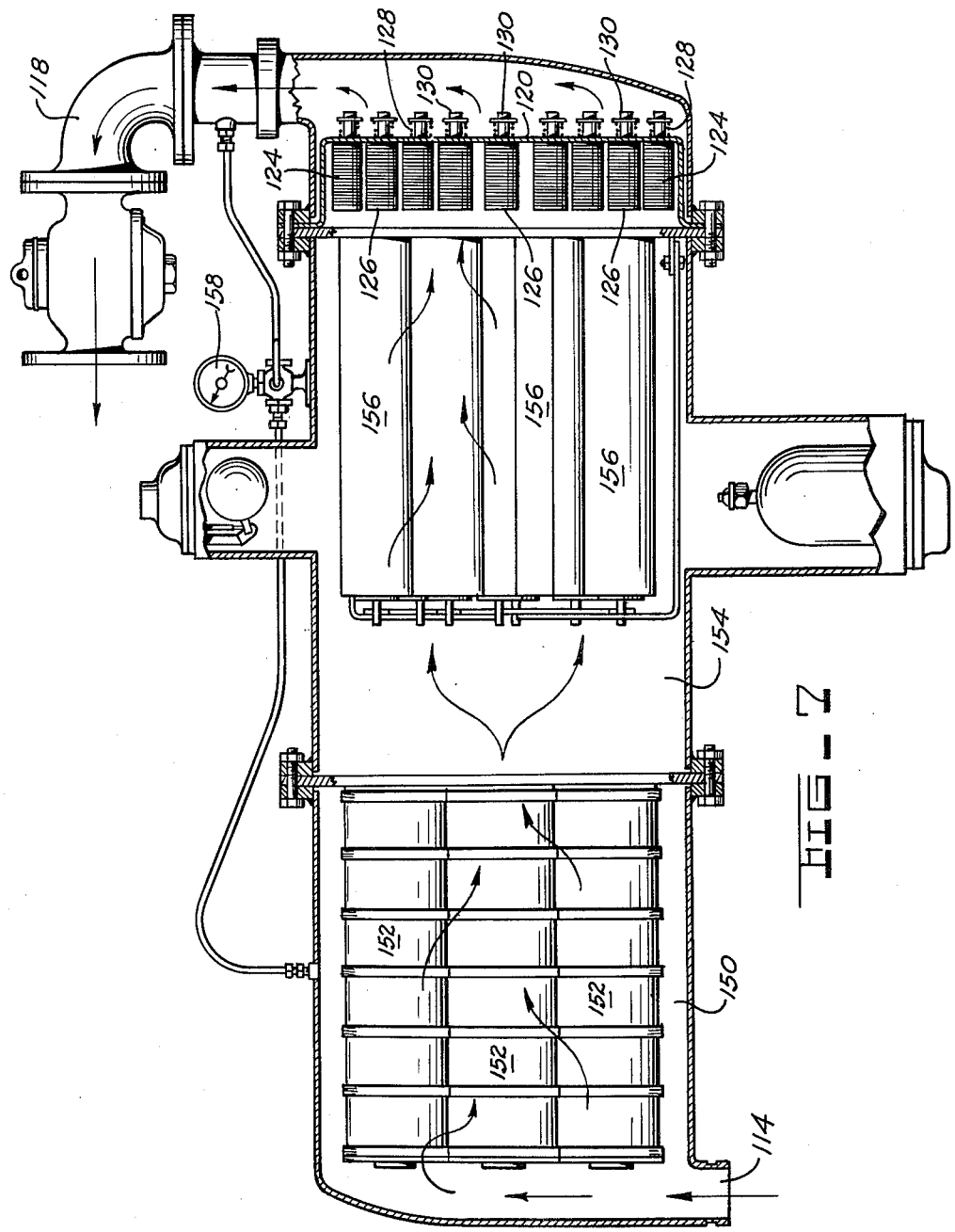

United States Patent Office 3,034,656
Patented May 15, 1962

3,034,656
FUEL QUALITY TESTING DEVICE
Walter Kasten, Madison Heights, Mich., assignor to The Bendix Corporation, a corporation of Delaware
Filed Aug. 10, 1959, Ser. No. 832,667
16 Claims. (Cl. 210—492)

This invention relates to a fuel quality testing device and more particularly to improvements in a water sensitive fuel quality testing device.

In order to be certain that only fuel free of water is utilized in aircraft, and in particular jet aircraft, all sorts of devices have been, and are presently being, developed and tested to check the presence of water in fuels. Most of these devices are very costly electronic units which are difficult to calibrate and require skilled personnel for their operation. Usually, such devices are placed at the outlet of the filter water separator so that they may indicate when the filter water separator has reached the end of its useful life and is no longer separating water from the fuel.

In England, a washer type filter has been used for the purpose of testing fuel, said filter being formed entirely of washers which have been made of untreated (not resin impregnated) filter paper. Consequently, as soon as fuel with free water enters this type of filter, the washers swell, thereby closing the spaces or pores between the washers. Such closing of the filter pores completely stops the flow of fuel or increases the pressure differential to the point where the pump cannot handle it. This is a rather foolproof arrangement, but it has serious defects in that it is too large and too costly. For example, if this type of a filter were used to handle about 100 g.p.m. at a pressure drop of 5 p.s.i., 84 stacks of washer-type elements would be required, each of which would be 27" long and 1⅝" in diameter. The housing for these elements would be approximately 20" in diameter and 55" high. As most of the refueling in the United States is done at 300 g.p.m., and even as high as 1200 g.p.m., it becomes quite obvious that a device of this type would be too cumbersome to use at the refueling end point.

An additional drawback of the arrangement utilizing untreated washer-type elements is that a device of this type is not only sensitive to water, but is also very sensitive to small amounts of solid contamination, since the passages or pores between the washers are submicronic. Consequently, these washer type elements become plugged quite quickly. For example, most filter water separators will have an effluent of approximately 4 mg. of solid contamination per gallon. This would mean that, with each 1000 gallons of fuel filtered, there will be a discharge of as much as 4 grams of solid contamination. If only 100,000 gallons of fuel are pumped per day, a fuel testing device may be subjected to several hundred grams of solid contaminants, and those devices using untreated washer-type elements would retain at least 95%, if not more, of these contaminants. This would increase the pressure drop through the washer-type elements to the point where they would have to be cleaned or replaced, a situation that would occur much too soon and too often.

It is, therefore, an object of this invention to provide a water sensitive fuel quality testing device, similar in operation to the above mentioned washer-type filter, but without the inherent deficiencies of large size, high cost, great sensitivity to small particles and short operating life.

Another object of this invention is to provide a water sensitive fuel quality testing device utilizing one or more edge type elements which will be suitable for high flow rates.

Another object of this invention is to provide an edge type water sensitive element for a fuel quality testing device which includes a first series of layers of material substantially insensitive to water and a second series of layers of water sensitive material which will swell upon contact with water, wherein the series of layers are interleaved to form alternate layers of water sensitive and water insensitive materials.

More specifically, it is an object of this invention to provide an edge type water sensitive element for a fuel quality testing device which includes a first series of registered face-to-face contacting layers of an uneven surface material substantially insensitive to water and held together by a noncontinuous bond to form a unitary tubular element having radially extending pores, and a second series of noncontacting layers of water sensitive material interposed between said first series of layers which will swell and substantially close the pores of said tubular element upon contact with water.

A further object of this invention is to provide a water sensitive fuel quality testing device which may be permanently incorporated directly into a fuel filter water separator.

A still further object of this invention is to provide a portable water sensitive fuel quality testing device which may be readily moved from refueler to refueler.

Other objects and advantages will become apparent from the following description and accompanying drawings, wherein:

FIGURE 1 is a sectional view of a fuel quality testing device, incorporating my invention;

FIGURE 1A is an enlarged somewhat exaggerated view of the circumscribed portion of the edge type water sensitive element shown in FIGURE 1;

FIGURE 1B is a view similar to FIGURE 1A showing a variation in the construction of the element shown in FIGURE 1;

FIGURE 1C is another view similar to FIGURE 1A showing a further variation in the construction of the element shown in FIGURE 1;

FIGURE 1D is another view similar to FIGURE 1A showing a still further variation in the construction of the element shown in FIGURE 1;

FIGURE 2 is a partially exploded view of a washer-type element formed in accordance with my invention;

FIGURE 3 is a view partially in section of a portable water sensitive fuel quality testing device incorporating my invention;

FIGURE 4 is a sectional view taken substantially along line 4—4 of FIGURE 3;

FIGURE 5 is a sectional view of an element arrangement similar to those in FIGURE 3;

FIGURE 6 is a sectional view of the FIGURE 5 arrangement after water has contacted the element; and FIGURE 7 is a view partially in section of a filter water separator incorporating my invention directly within the separator housing.

Referring to FIGURE 1 of the drawings, it will be seen that numeral 10 indicates a housing which includes a lower portion 12 having an inlet port 14 and an upper portion 16 having an outlet port 18. Between the housing portions 12 and 16 is located a retainer plate 20, said housing portions and retainer plate being held together by suitable means, such as bolts 22 (only one of which is shown). The inlet and outlet 14 and 18 may be threaded internally to receive suitable fittings for installation of the unit 10 in hose nozzles or other refueling devices. An edge type porous element 24 is located within unit 10 and is retained in position by an end cap 26 which is operatively connected to a Belleville type spring 28 through means of bolt 30.

The element 24 preferably consists of layers or convolutions 32 helically wound to form the side walls of the element, said layers having radial pores therebetween to provide passages for the fluid flowing therethrough. The layers 32 of the element may be formed from paper, cellulose, or fibrous material held together by a discontinuous bond so distributed that radial pores are formed between the layers at frequent intervals. The discontinuity of the bond may be controlled by using material, having a predetermined rugosity on both surfaces thereof, so that the valleys of the rugosities form the passages and the peaks thereof form the points of contact between the adjacent layers. The material used is preferably treated before the element is formed with a thermosetting resinous substance such as a phenolic formaldehyde condensation product, in order to render the material substantially insensitive to water. After the element has been formed, it is heated to a temperature and for a time sufficient to cause the resinous substance to set, making the material forming the layers of the element, but not the element itself, impervious to fluid, the pores between the layers remaining open after the treatment.

In the fabrication of the element, ribbon or ribbon-like material, having a width substantially equal to the thickness of the final element wall, is wound edgewise to form a cylindrical member, which is thereafter cut to the desired length. The method for winding and making such an element is disclosed and claimed in my Patent No. 2,421,704, issued June 3, 1947.

As shown in FIGURES 1 and 1A, interposed between the convolutions or layers 32 near the outside surface of the element wall is a strip or ribbon 34 of water sensitive material, such as cotton or untreated paper. This water sensitive material is wound simultaneously with the ribbon 32 between the convolutions thereof, so that the final article consists of alternate layers of material, one of which is water sensitive and will swell and the other of which is not substantially water sensitive and will not swell or will swell very little. The rugosities of ribbon convolutions 32 are compressed slightly by the convolutions 34 in order to permit the adjacent convolutions 32 to be bonded together to form a rigid compact unit. The water sensitive material used in forming convolutions 34 will not materially restrict the flow of fluid through the radial pores between the layers of the element, as long as there is no water in the fuel. If water is present in the fuel, the water sensitive material will swell and will block, or substantially block, flow through the element. The method of forming an element having alternate layers of material, as discussed above, is disclosed in my Patent No. 2,647,976, issued August 4, 1953. In comparing a ribbon element of this type with a washer-type fuel testing element made from untreated material of the type previously described, it has been found that a washer-type element 1⅝″ in diameter by 27″ long has a flow of only 1 g.p.m. of clean fuel with a 2 p.s.i. pressure drop, whereas a ribbon element of the same size will permit a flow of over one hundred times as much with the same pressure differential.

Other variations in the construction of the water sensitive element 32 are quite evident. Thus the ribbon 32 could be wound perpendicular to the mandrel to obtain elements, as shown in FIGURES 1B, 1C, and 1D instead of being wound at an angle to obtain an element, as shown in FIGURE 1A. Furthermore, the water sensitive strip 34 could be either at the outer or inner diameter, as shown in FIGURES 1B and 1D, respectively, or two strips could be used, one of which is at the outer diameter and the other of which is at the inner diameter, as shown in FIGURE 1C. It is important, however, that a portion of the adjacent layers of resin impregnated ribbons 32 contact each other so as to allow the resin during the cure to weld the unit into one structure.

Instead of helically winding a resin impregnated ribbon 32 and a strip of water sensitive material 34, a similar element could be made (although it would be somewhat more bulky) by using a washer-type construction, as shown in FIGURE 2, wherein alternate layers of resin impregnated crepe paper washers 36 and plain water sensitive paper washers 38 are interleaved. This washer-type element, however, does have a disadvantage in that where equal size washers 36 and 38 are used the resin impregnated washers are not permitted to be bonded to each other, and a self contained unitary structure is not possible. This drawback may be obviated by utilizing different size washers 36 and 38 so that the resin impregnated washers 36 can contact and be bonded to each other in the manner disclosed in my Patent No. 2,375,246, issued May 8, 1945. A cross-sectional view of one wall of such a washer-type element would be similar to those shown in FIGURES 1B, 1C and 1D.

In the operation of my device, it will be seen that water free fuel will normally enter inlet passage 14, flow through the edge type porous element 24, and leave via outlet passage 18. If there is any water in the fuel the strip 34 will swell and substantially close the pores of element 24. The swollen inner layer 34 will not only diminish the normal port size between the layers but will also tend to extend the length of the element. But, since the element 24 is retained by a bolt 30 attached to the end cap 26 and to the Belleville spring 28, it cannot increase in length without further decreasing the pore size. Other high load per deflection rate springs may be used instead of the Belleville spring shown, but it should be remembered that whether or not fuel flow is completely shut off through the element when water hits the water sensitive strip is dependent to some extent on the rate of the spring which retains the element in position. In any event, the device may be arranged so that the pressure differential across the water sensitive element 24 will increase to such an extent after contact with water that the pump in the system will no longer be able to function and fuel flow will be cut off, or the device may be arranged so that the fuel flow will not be completely cut off. In the latter arrangement the presence of water in the fuel could be determined by referring to a gauge which would indicate an increase in the pressure differential across the element.

FIGURES 3 and 4 indicate a portable water sensitive fuel quality testing device incorporating a plurality of the water sensitive elements constructed in accordance with my invention. Like parts are designated with the same numerals as in FIGURE 1 plus 100. The portable unit consists of a housing 110 which includes a lower portion 112 having an inlet port 114 and an upper portion 116 having an outlet port 118. Between the housing portions is located a retainer plate 120, said housing portions and retainer plate being held together by a plurality of bolts 122. The inlet port 114 may be provided with a suitable fitting for connection with the outlet of a fuel filter water separator and the outlet 118 of the unit is normally connected to a hose 140, as shown in FIGURE 3. A plurality of edge type porous elements 124 of the type previously described are each operatively connected to the retainer plate 120 through means of hollow rods 130 having end caps 126 on the end thereof and coil springs 128. Operation of the FIGURE 3 portable unit is essentially the same as that of the FIGURE 1 unit, except that in this instance a plurality of elements 124 are utilized to accommodate the higher fuel flow. Recirculation of the effluent from the filter water separator through this portable fuel testing device will establish, within one minute, the condition of the filter water separator. Furthermore, the fuel quality tester may be regenerated by drying the elements and may be readily moved from refueler to refueler.

Since flow through elements 124 of FIGURE 3 is from the outside thereof to the inside thereof and then through coil springs 128, it is possible to provide an additional shut-off point by utilizing a calibrated spring 128 which will tend to resist the extension in length of the elements 124, but which upon extension of the element will be compressed to a position wherein the coils of the spring contact each other to provide an additional flow shut-off point. This feature is illustrated in FIGURES 5 and 6 which show enlarged views of the element arrangements of FIGURE 3, except that a solid rod 131 is utilized instead of a hollow rod 130. Thus, referring to FIGURE 5, it is seen that as long as fuel free of water is being tested flow will be through element 124 from outside-in and will flow between the coils of spring 128. However, if there is any water in the fuel the water sensitive layers of the element will swell, as previously described, substantially closing off the pores of the element and causing an extension in the length of the element 124 to a point wherein the coils of spring 128 will contact one another, as shown in FIGURE 6, thereby providing an additional shut-off point in the arrangement.

FIGURE 7 shows a fuel filter water separator which includes a first stage 150 containing a plurality of demulsifying elements 152 and a second stage 154 containing a plurality of filter elements 156 which prevent any droplets of water from passing therethrough. Between the second stage and the outlet is a water sensitive fuel quality testing device which is exactly the same as that which is shown in the FIGURE 3 embodiment, except that it is permanently located within the separator housing. Since the water sensitive fuel quality testing device is exactly the same as the FIGURE 3 embodiment, the same numerals have been applied and the construction of the device will not be described again. Operation of the water sensitive elements is the same as previously described, except that in this instance a pressure gauge 158 is utilized to indicate the presence of water in the fuel, since the water, as previously described, will tend to close the pores of elements 124 and increase the differential pressure thereacross.

The several practical advantages which flow from my invention are believed to be obvious from the above description, and other advantages may suggest themselves to those who are familiar with the art to which this invention relates.

Having thus described the various features of my invention, what I claim as new and desire to secure by Letters Patent is:

1. A water sensitive fuel quality testing device for use with a fuel filter and water separator unit comprising a housing having a fluid inlet passage and a fluid outlet passage, retaining means operatively connected to said housing and located between said inlet and outlet passages, a normally porous member operatively connected to said retaining means for permitting flow from said inlet passage to said outlet passage, said porous member including a first series of layers of non water sensitive material which is impervious to fluid and will remain substantially inert upon contact with water and a second series of layers of water sensitive material which will swell upon contact with water, said first and second series of material being interleaved to form alternate layers of water sensitive and non water sensitive materials having pores formed therebetween for permitting flow of fluid therethrough, said pores being substantially blocked upon swelling of said water sensitive material, and means operatively connected to said member for opposing expansion of said porous member during swelling of said water sensitive material.

2. A water sensitive fuel quality testing device for use with a fuel filter and water separator unit comprising a housing having a fluid inlet passage and a fluid outlet passage, retaining means operatively connected to said housing and located between said inlet and outlet passages, a normally porous member operatively connected to said retaining means for permitting flow from said inlet passage to said outlet passage, said porous member including a first series of registered face-to-face contacting layers of an uneven surface non water sensitive material which is impervious to fluid and will remain substantially inert upon contact with water, said layers being bonded together to form a unitary porous member having pores formed between said layers for permitting flow of fluid therethrough, and a second series of non-contacting layers of water sensitive material interposed between said first series of layers which will swell upon contact with water and substantially close the pores of said member, and means operatively connected to said member for opposing expansion of said unitary porous member during swelling of said water sensitive material.

3. A water sensitive fuel quality testing device for use with a fuel filter and water separator unit comprising a housing having a fluid inlet passage and a fluid outlet passage, a retainer plate operatively connected to said housing and located between said inlet and outlet passages, a normally porous hollow tubular element operatively connected to said retainer plate for permitting flow from said inlet passage to said outlet passage, said element including a first series of registered face-to-face contacting layers of an uneven surface non water sensitive material which is impervious to fluid and will remain substantially inert upon contact with water, said layers being bonded together to form a unitary tubular element having radial pores extending between said layers for permitting flow of fluid therethrough, and a second series of non-contacting layers of water sensitive material embedded between said first series of layers which will swell and substantially close the pores of said tubular element upon contact with water, and means operatively connected to said element for opposing an increase in length of said element during swelling of said water sensitive material.

4. A water sensitive fuel quality testing device as defined in claim 3 wherein a plurality of porous hollow tubular elements are operatively connected to the retainer plate for permitting flow from said inlet passage to said outlet passage.

5. A water sensitive fuel quality testing device for use with a fuel filter and water separator unit comprising a housing having a fluid inlet passage and a fluid outlet passage, a retainer plate operatively connected to said housing and located between said inlet and outlet passages, a plurality of normally porous elements operatively connected to said retainer plate for permitting flow therethrough from said inlet passage to said outlet passage, each of said elements including a plurality of axially aligned convolutions of a non water sensitive material which is impervious to fluid and will remain substantially inert upon contact with water, said convolutions being bonded together to form a hollow tubular member with radial pores between the convolutions for permitting flow of fluid therethrough, and a plurality of convolutions of water sensitive material interposed between said first mentioned convolutions which will swell and substantially close said pores upon contact with water, and means operatively connected to said element for opposing an increase in length of said element during swelling of said water sensitive material.

6. A water sensitive fuel quality testing device for use with a fuel filter and water separator unit comprising a housing having a fluid inlet passage and a fluid outlet passage, a retainer plate operatively connected to said housing and located between said inlet and outlet passages, said retainer plate having a plurality of openings therethrough, a normally porous element associated with each of said openings and operatively connected to said retainer plate for permitting flow from said inlet passage to said outlet passage, said porous element including a plurality of axially aligned convolutions of a resin impregnated ribbon material which is impervious to fluid and will remain substantially inert upon contact with water and is bonded together by said resin, said ribbon material having transversely arranged rugosities in the surfaces thereof for forming radially extending pores between said convolutions for permitting flow of fluid therethrough, and a strip of water sensitive material interposed between said convolutions which will swell and substantially close said radially extending pores upon contact with water, an end cap located at one end of said porous element, and resilient means operatively connected to said end cap and housing for urging said element toward said retainer plate and opposing an increase in length of said element during swelling of said water sensitive material.

7. A water sensitive fuel quality testing device as defined in claim 6 wherein said resilient means comprises a coil spring which provides an additional obstruction to flow of fuel from said inlet passage to said outlet passage after an increase in length of said element causes the coils of said spring to contact each other and prevent flow therebetween.

8. A water sensitive element for a fuel quality testing device comprising a first series of layers of non water sensitive material which is impervious to fluid and will remain substantially inert upon contact with water and a second series of layers of water sensitive material which will swell upon contact with water, said series of layers being interleaved to form alternate layers of water sensitive and non water sensitive materials having pores formed therebetween for permitting flow of fluid therethrough, said pores being substantially blocked upon swelling of said water sensitive material.

9. A water sensitive element for a fuel quality testing device comprising a first series of registered face-to-face contacting layers of an uneven surface non water sensitive material which is impervious to fluid and will remain substantially inert upon contact with water and is bonded together to form a unitary tubular element having substantially radial pores extending between said layers for permitting flow of fluid therethrough, and a second series of non-contacting layers of water sensitive material interposed between said first series of layers which will swell and substantially close the pores of said tubular element upon contact with water.

10. A water sensitive element for a fuel quality testing device comprising a plurality of axially aligned convolutions of a non water sensitive material which is impervious to fluid and will remain substantially inert upon contact with water, said convolutions being bonded together to form a hollow tubular member with radial pores between the convolutions for permitting flow of fluid therethrough, and a plurality of convolutions of water sensitive material interposed between said first mentioned convolutions which will swell and substantially close said pores upon contact with water.

11. A water sensitive element for a fuel quality testing device comprising a plurality of axially aligned continuous convolutions of a non water sensitive material which is impervious to fluid and will remain substantially inert upon contact with water, said material being arranged to form a hollow tubular member having radial pores between said convolutions extending from the hollow interior of said member to the outside surface thereof, and a continuous strip of water sensitive material interposed between said convolutions which will swell and substantially close the pores of said tubular element upon contact with water.

12. A water sensitive element for a fuel quality testing device comprising a plurality of axially aligned convolutions of a resin impregnated ribbon material which is impervious to fluid and will remain substantially inert upon contact with water and is bonded together by said resin, said ribbon material having transversely arranged rugosities in the surfaces thereof for forming radially extending pores between said convolutions for permitting flow of fluid therethrough, and a strip of water sensitive material interposed between said convolutions which will swell and substantialy close said radially extending pores upon contact with water.

13. A water sensitive member for a fuel quality testing device comprising a first series of registered face-to-face contacting washerlike elements of an uneven surface non water sensitive material which is impervious to fluid and will remain substantially inert upon contact with water and is bonded together to form a unitary tubular element having radially extending pores between said washers for permitting flow of fluid therethrough, and a second series of noncontacting washerlike elements of water sensitive material interposed between said first series of washerlike elements which will swell and substantially close said radially extending pores upon contact with water.

14. A water sensitive member for a fuel quality testing device comprising a first series of washerlike elements formed of a non water sensitive material which is impervious to fluid and will remain substantially inert upon contact with water and a second series of washerlike elements formed of a water sensitive material which will swell upon contact with water, said first and second series of washerlike elements being interleaved to form alternate layers of water sensitive and non water sensitive materials having pores formed therebetween, said pores being substantially blocked upon swelling of said water sensitive material.

15. A water sensitive fuel quality testing device for use in connection with fuel transfer means comprising housing means having fuel inlet and outlet passage means, said fuel inlet passage means being operatively connected to said fuel transfer means for receiving the full flow of fuel therefrom, normally porous means interposed between said inlet and outlet passage means for normally permitting flow of all of said fuel therethrough, said means comprising at least one layered edge-type element having radially extending pores formed between said layers for permitting flow of fuel therethrough, said element including a water sensitive material adjacent said pores capable of swelling upon contact with water and closing off said pores to thereby prevent further flow therethrough.

16. A water sensitive fuel quality testing device for use in connection with fuel transfer means comprising housing means having fuel inlet and outlet passage means, said fuel inlet passage means being operatively connected to said fuel transfer means for receiving the full flow of fuel therefrom, normally porous means interposed between said inlet and outlet passage means for normally permitting flow of all of said fuel therethrough, said means comprising at least one washer-type element having radially extending pores formed between said washers for permitting flow of fuel therethrough, said element including at least one washer formed of a water sensitive material adjacent said pores capable of swelling upon contact with water and closing off said pores to thereby prevent further flow therethrough.

References Cited in the file of this patent

UNITED STATES PATENTS

| | | |
|---|---|---|
| 2,079,365 | Thomas | May 4, 1937 |
| 2,382,278 | Widmann | Aug. 14, 1945 |
| 2,495,095 | Ewbank | Jan. 17, 1950 |
| 2,692,686 | Fleck | Oct. 26, 1954 |
| 2,767,851 | Muller | Oct. 23, 1956 |

FOREIGN PATENTS

| | | |
|---|---|---|
| 527,259 | Great Britain | Oct. 4, 1940 |
| 987,457 | France | Apr. 18, 1951 |